United States Patent
Lee

(10) Patent No.: US 7,658,845 B2
(45) Date of Patent: Feb. 9, 2010

(54) FUNCTIONAL WATER PURIFIER

(76) Inventor: Byung Kul Lee, 1842-17, Sinjeong-1Dong, Nam-Gu, Ulsan 680-011 (KR)

( * ) Notice: Subject to any disclaimer, the term of this patent is extended or adjusted under 35 U.S.C. 154(b) by 428 days.

(21) Appl. No.: 10/595,983

(22) PCT Filed: Jun. 24, 2005

(86) PCT No.: PCT/KR2005/001974

§ 371 (c)(1),
(2), (4) Date: May 23, 2006

(87) PCT Pub. No.: WO2006/004329

PCT Pub. Date: Jan. 12, 2006

(65) Prior Publication Data

US 2008/0169232 A1 Jul. 17, 2008

(30) Foreign Application Priority Data

Jul. 6, 2004 (KR) .................... 10-2004-0052355

(51) Int. Cl.
 C02F 1/28 (2006.01)
 C02F 1/30 (2006.01)
 C02F 1/48 (2006.01)

(52) U.S. Cl. .......... 210/223; 310/287; 310/290
(58) Field of Classification Search ............. 210/223, 210/287, 290
See application file for complete search history.

(56) References Cited

U.S. PATENT DOCUMENTS

2003/0141234 A1 7/2003 Chien

FOREIGN PATENT DOCUMENTS

| JP | 09-271757 | 10/1997 |
| JP | 11-221572 | 8/1999 |
| KR | 96-4136 | 2/1996 |
| KR | 1020020022634 | 3/2002 |

*Primary Examiner*—David A Reifsnyder
(74) *Attorney, Agent, or Firm*—IPLA P.A.; James E. Bame

(57) ABSTRACT

The invention relates to bio water purifier which improves the structure of water molecular and changes the water to weak alkali drinker. The invention comprises a sediment filter removing rust and floating matters in the water, a precarbon filter removing chlorine and impurities in the water, a ceramic material tube improving the water molecule, maximizing movement of the water molecule and making weak alkali water by radiating far infrared ray, a silver carbon filter removing odor and bacteria in the water and activating the water, and a ceramic filter removing various harmful matters in the water.

11 Claims, 4 Drawing Sheets

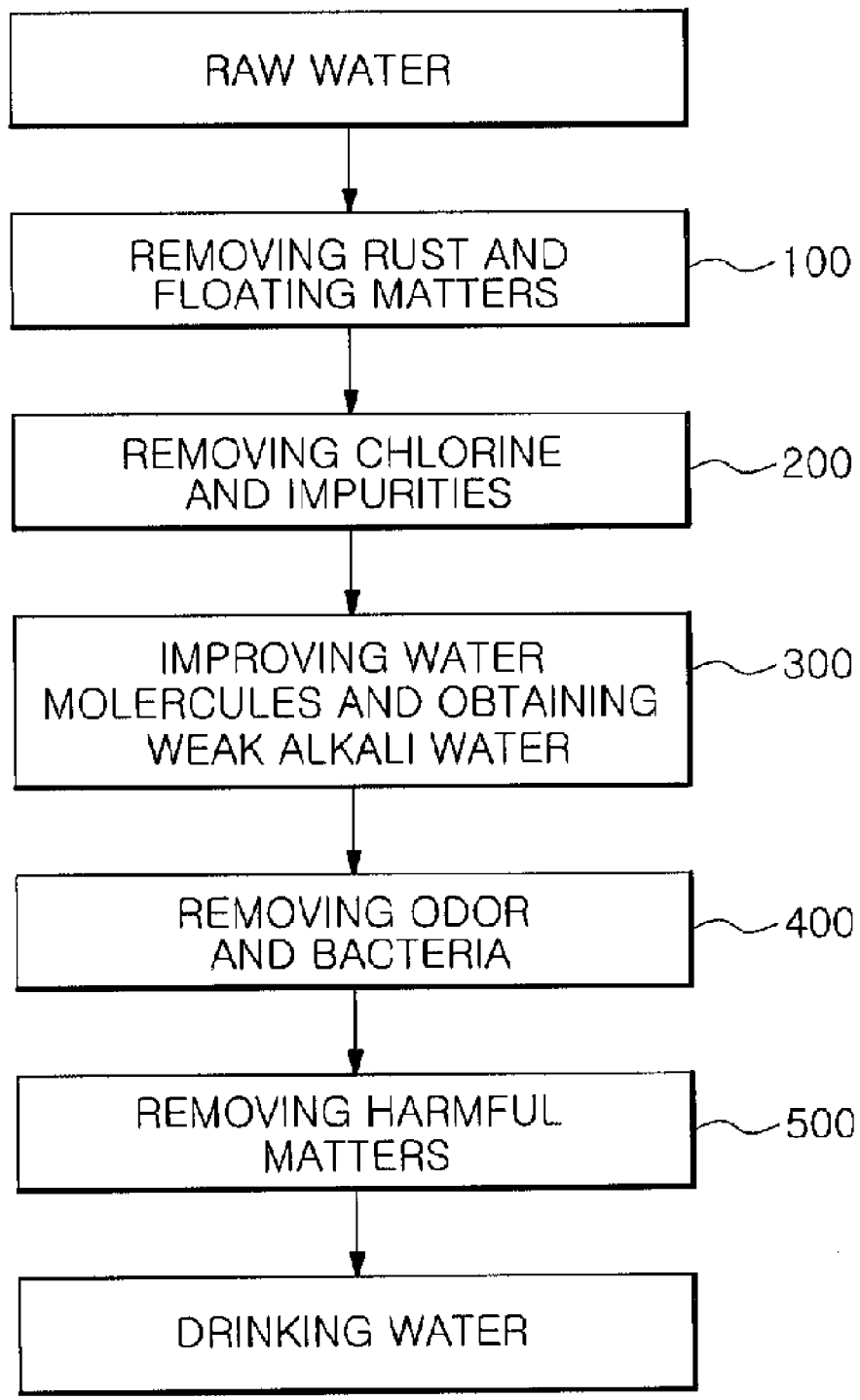
[Fig. 1]

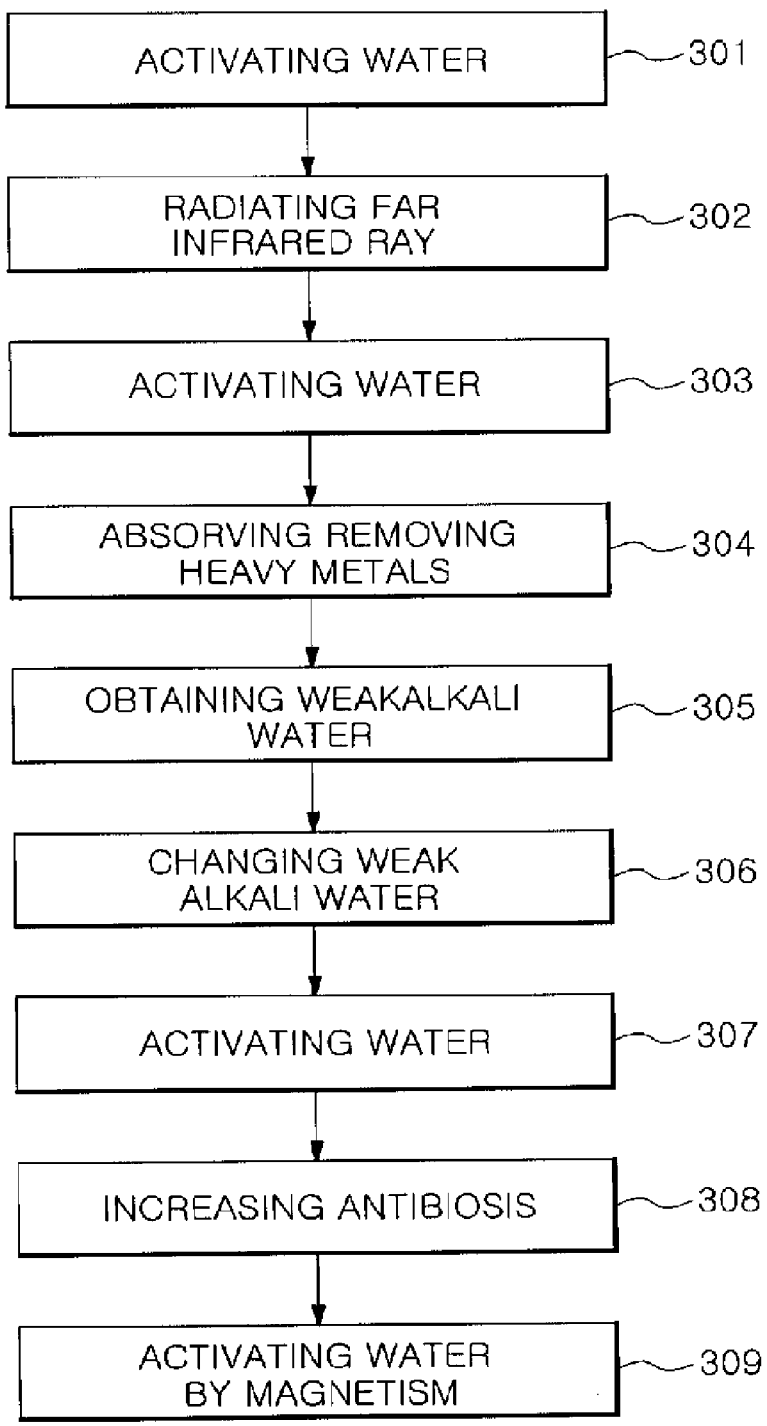
[Fig. 2]

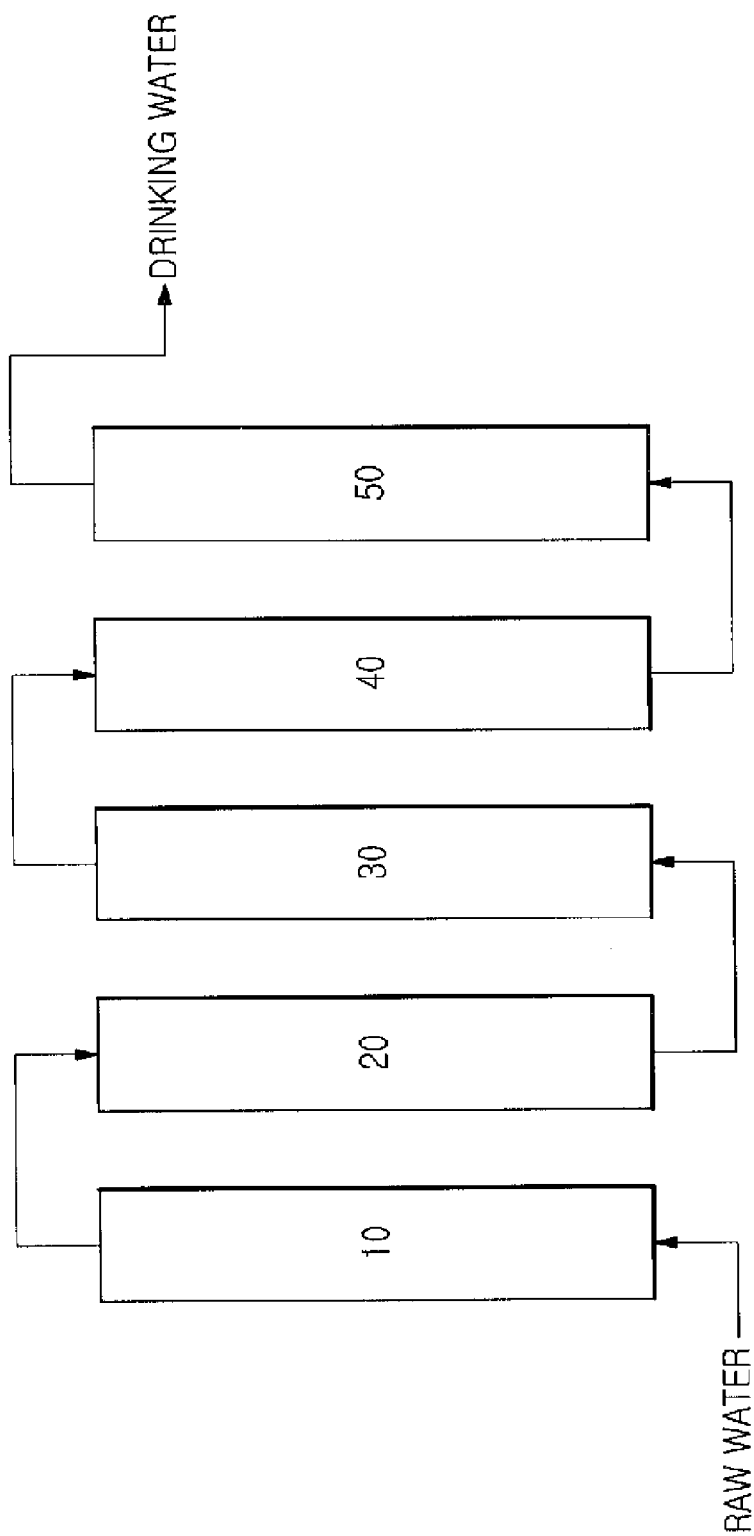
[Fig. 3]

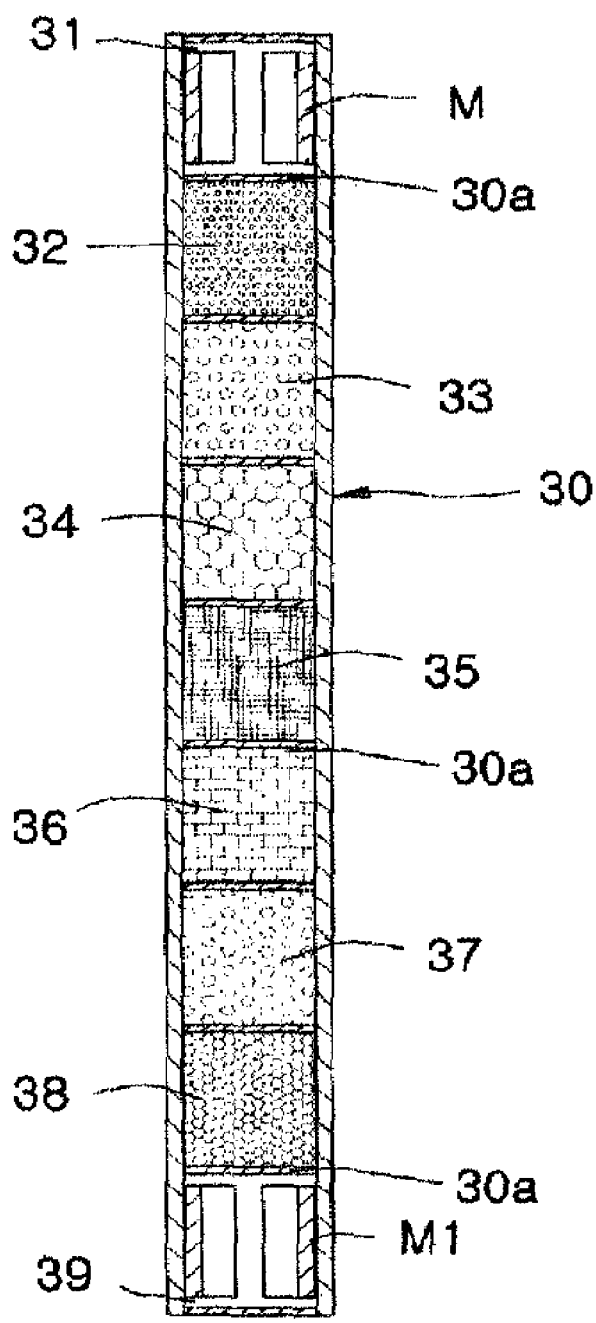
[Fig. 4]

ic material tube of the invention.

FUNCTIONAL WATER PURIFIER

FIELD OF INVENTION

The present invention relates to a water purifier, and more particularly, relates to bio water purifier which improves the structure of water molecular and changes the water to weak alkali drinker.

BACKGROUND OF THE INVENTION

Generally, water is source of health and is absolutely necessary to human body because about 70% of human body is water. Accordingly, clean water is beneficial to health, but water polluted by various heavy metals is harmful.

The conventional reverse osmotic pressure water purification method comprises a step of removing rust and floating matters, a step of removing chlorine and impurities, a step of removing odor and bacteria and a step of activating water. But during this treatment, weak acid water is obtained which is not in favor of human body and a lot of water is wasted.

SUMMARY OF THE INVENTION

The invention is suggested to solve the above mentioned problems and the object of the invention is to provide a water purifier which change water into weak alkali water by ceramic and magnet.

According to the first aspect of the invention, there is provided a water purification method comprising: a first process of removing rust and floating matters in the water; a second process of removing chlorine and impurities in the water; a third process of improving water molecules and maximizing the movement of the water molecules, and radiating far infrared ray to obtain weak alkali water; a fourth process of removing odor and bacteria and activating the water, and a fifth process of removing various harmful matters in the water.

And according to the second aspect of the invention, the third process comprises: a first step of activating water by magnetism; a second step of radiating far infrared ray and maximizing the movement of the water molecule; a third step of activating the water; a fourth step of absorbing heavy metals in the water to be removed; a fifth step of obtaining natural weak alkali water; a sixth step of changing the water into weak alkali water by radiating far infrared ray; a seventh step of activating the water; a eighth step of improving antibiosis of the water, and a ninth step of activating the water by magnetism.

And according to the third aspect of the invention, there is provided a water purifier comprising a sediment filter removing rust and floating matters in the water, a precarbon filter removing chlorine and impurities in the water, a ceramic material tube improving the water molecule, maximizing movement of the water molecule and making weak alkali water by radiating far infrared ray, a silver carbon filter removing odor and bacteria in the water and activating the water, and a ceramic filter removing various harmful matters in the water.

And according to the fourth aspect of the invention, the ceramic material tube includes a first magnet tube, bio ceramic balls, tourmalin ceramic balls, alumina ceramic balls; natural black jades, sericite ceramic balls, bio macsumsuk ceramic balls, an antibiosis ceramic balls, and a second magnet tube.

BRIEF DESCRIPTION OF THE DRAWINGS

FIG. 1 is a block diagram showing the entire processes of the invention;
FIG. 2 is a block diagram showing the third process of the invention;
FIG. 3 is a schematical view of the invention; and
FIG. 4 is a vertical sectional view showing a ceramic material tube of the invention.

DETAILED DESCRIPTION OF THE INVENTION

A preferred embodiment of the present invention is now described in detail below by referring the accompanying drawings.

As shown FIG. 1, a water purifier according to an embodiment of the invention comprises a first process 100 of removing rust and floating matters in the water; a second process 200 of removing chlorine and impurities in the water; a third process 300 of improving the water molecules and maximizing the movement of water molecules and radiating far infrared ray to obtain weak alkali water; a fourth process 400 of removing odor and bacteria in the water and activating the water; and a fifth process 500 of removing various harmful matters in the water.

Preferably, as shown in FIG. 2, the third process 300 comprises a first step 301 of activating the water by magnetism; a second step 302 of radiating far infrared ray and maximizing the movement of the water molecule; a third step 303 of activating the water and dissolving various minerals; a fourth step 304 of absorbing heavy metals in the water to be removed and enhancing far infrared ray radiant energy so that water molecule structure is improved; a fifth step 305 of providing the water with terrestrial magnetism and obtaining the natural weak alkali water; a sixth step 306 of radiating far infrared ray and changing the water into weak alkali water; a seventh step 307 of activating the water in order that the water may be efficiently absorbed in a human body and diuresis may be enhanced; a eighth step 308 of improving antibiosis of the water, and a ninth step 309 of activating the water by magnetism.

Also, as shown in FIG. 3, a water purifier according to an embodiment of the invention comprises a sediment filter 10 removing rust and floating matters in the water, a precarbon filter 20 removing chlorine and impurities in the water; a ceramic material tube 30 which, being consisted of nine layers, improves water molecule, maximizes movement of the water molecule, and makes weak alkali water by radiating far infrared ray; a silver carbon filter 40 removing odor and bacteria in the water and activating water, and a ceramic filter 50 removing various harmful matters in the water.

The sediment filter 10 filters off rust and floating matters of big size and preferably it is made of non-woven fabric made of Poly Propylene. The pre carbon filter 20 is made of the activated charcoal, and it removes residual chlorine and organic matter in the water.

Preferably, as shown in FIG. 4, the ceramic material tube 30 comprises a first magnet tube 31 which is made of permanent magnets M whose N pole or S pole are arranged at upper or lower portion respectively, and the water flows between the permanent magnets M; bio ceramic balls 32 made of serpentinite hornblende; tourmalin ceramic balls 33 made by firing tourmalin at high temperature; alumina ceramic balls 32;

natural black jades 35; sericite ceramic balls 36 having wavelength range which are similar to that of human body and made by firing rough sericiteat at high temperature; bio macsumsuk ceramic balls 37 made of rough macsumsuk; antibiosis ceramic balls 38; and a second magnet tube 39 which is made of permanent magnets M1 whose N pole or S pole are arranged at upper or lower portion.

Preferably, the permanent magnets M, M1 used in the first and second magnet tube 31, 39 have magnetism of about 2000 Gauss.

Preferably, the bio ceramic balls 32 are made of serpentinite hornblende, their diameter is 4~6 mm, and they radiate far infrared ray of 5.6~2.0 microns.

Preferably, the tourmalin ceramic balls 33 are made by firing the tourmalin at 1,000° C.~1,2000° C., their diameter is 2.5-3.5 mm, and they generate electricity of 0.06 mA by appling heat, pressure, friction an so on.

Preferably, diameter of the alumina ceramic balls 34 is 2.5-3.5 mm.

Preferably, diameter of the natural black jades 35 is 6-8D. Preferably, the sericite ceramic balls 36 are made of rough sericite and their diameter is 2.5~3.5 mm.

Preferably, the bio macsumsuk ceramic balls 37 are made of rough macsumsuk and their diameter is 2.5~3.5 mm.

Preferably, diameter of the antibiosis ceramic balls 38 is 4~6 mm.

Observing the composition ratio of each layer of the ceramic material tube 30 with volume percentage, it preferably comprises 5% of the first magnet tube 31, 10% of the bio ceramic balls 32, 20% of the tourmalin ceramic balls 33, 10% of the alumina ceramic balls 34, 15% of the natural black jades 35, 10% of the sericite ceramic balls 36, 15% of the bio macsumsuk ceramic balls 37, 10% of the antibiosis ceramic balls 38, 5% of and the second magnet tube 39.

The non-woven fabrics filter 30a treated to have antibiosis is positioned between each layer of the ceramic material tube 30, so that it prevents from mixing each layer and removes bacteria and impurities.

The silver carbon filter 40 is a filter where silver-coated activated charcoals are filled. The silver carbon filter 40 absorbs odor and gas and the like, and it suppresses bacteria breeding.

The ceramic filter 50 is comprised of porous minerals and it filters off harmful matters and colon bacillus.

The function of preferred embodiment of the invention will be describes below.

While the water flows through the sediment filter 10, rust, floating matters or dregs are removed (The first process).

After, the water flows through the precarbon filter 20 and residual chlorine, residual organic matter or residual impurities are removed (The second process).

And, while the water flows through each layer of ceramic material tube 30, structure of water molecules are improved and the water is changed into functional water (The third process).

The function of each layer of the ceramic material tube 30 is describes below.

While the water flows through the first magnet tube 31, the water is changed to magnetized water by permanent magnet M. Magnetization water has relatively small cluster which means water molecule group so that the magnetized water is efficiently absorbed in a human body. Also, kinetic energy of oxygen dissolved in the magnetized water is increased and when the oxygen is absorbed in human body, blood oxygen may be increased (The first step).

While the water having passed through the first magnetic tube 31 flows through the bio ceramic balls 32, water is activated by far infrared ray which is radiated from the ceramic balls 32 and movement of the water is maximized (The second step).

While the water having passed through the bio ceramic balls 32 flows through the tourmalin ceramic balls 33, the water is electrolyzed and could be efficiently absorbed in a human body because the size of the cluster of the water molecule group is reduced and the water is activated (The third step).

While the water having passed through the tourmalin ceramic balls 33 flows through the alumina ceramic balls 33, heavy metals in the water are absorbed and removed and structure of water molecule is improved and the water is changed to soft water (The fourth step).

While the water having passed through the alumina ceramic balls 33 flows through the natural black jades 35, water is changed to weak alkali water and terrestrial magnetism is supplemented in the water by natural black jades having magnetism, and iron oxide, calcium oxide, magnesia and the like may be supplemented in the water (The fifth step).

While the water having passed through the natural black jades 35 flows through the sericite ceramic balls 36, the water is changed to weak alkali water (The sixth step).

While the water having passed through sericite ceramic balls 36 flows through the macsumsuk ceramic balls 37, the water is activated in order that the water could be efficiently absorbed in a human body and diuresis may be enhanced (The seventh step).

While the water having passed through the macsumsuk ceramic balls 37 flows through the antibiosis ceramic balls 38, residual heavy metals in the water are absorbed and antibiosis water is enhanced (The eighth step).

When the water having passed through the antibiosis ceramic balls 38 flows through the second magnet tube 39, the water is treated as same as that the water is treated while it flows through the first magnet tube 31 (The ninth step).

As mentioned of above, bacteria and harmful heavy metals are removed by the ceramic material tube 30.

And, the water flows through the silver carbon filter 40, odor and gas are absorbed by silver-coated activated charcoal (The fourth process).

And, when the water pass through the pore of mineral, harmful matters and colon bacterium are removed and the water is changed to weak alkali water (The fifth process).

As mentioned above, the water which flows in the water purifier of the invention could be purified to be changed to weak alkali water. Especially, the water could be changed to weak alkali water of 7~8 pH so that it could activate metabolism of human body.

INDUSTRIAL APPLICABILITY

According to the invention described above, the water purifier of the invention could change the water polluted by heavy metal and harmful matters to clean, safe and rich mineral water.

What is claimed is:
1. A water purifier comprising:
 a sediment filter removing rust and floating matters in the water;
 a pre carbon filter removing chlorine and impurities in the water;
 a ceramic material tube for improving the water molecule, and maximizing movement of the water molecule and making weak alkali water by radiating far infrared ray;
 a silver carbon filter removing odor and bacteria in the water and activating the water; and a ceramic filter removing various harmful matters in the water, wherein the ceramic material tube comprises;

a first magnet tube which is made of permanent magnets whose N pole or S pole are arranged at upper or lower portion, respectively, and the water flows between the permanent magnets;

a layer of a plurality of bio ceramic balls made of serpentinite hornblende;

a layer of a plurality of tourmalin ceramic balls made by firing tourmalin at high temperature;

a layer of a plurality of alumina ceramic balls;

a layer of a plurality of natural black jades;

a layer of a plurality of sericite ceramic balls having wavelength range which are similar to that of human body and made by firing rough sericite at high temperature;

a layer of a plurality of bio macsumsuk ceramic balls made of rough macsumsuk (ore comprising elvan and amphibole);

a layer of a plurality of antibiotic ceramic balls, and a second magnet tube which is made of permanent magnets whose N pole or S pole are arranged at upper or lower portion, respectively.

2. The water purifier of claim 1, wherein the permanent magnets have magnetism of 2000 Gauss.

3. The water purifier of claim 1, wherein the bio ceramic balls layer is 4~6 mm in diameter, and radiates far infrared ray of 5.6~2.0 microns.

4. The water purifier of claim 1, wherein the tourmalin ceramic balls are made by firing the tourmalin at 1,0000 C~1,2000 C, their diameter is 2.5~3.5 mm, and they generate electricity of 0.06 mA by appling heat, pressure and friction.

5. The water purifier of claim 1, wherein the diameter of the alumina ceramic balls is 2.5~3.5 mm.

6. The water purifier of claim 1, wherein diameter of the natural black jades is 6~8 mm.

7. The water purifier of claim 1, wherein the sericite ceramic balls layer is 2.5~3.5 mm in diameter.

8. The water purifier of claim 1, wherein the bio macsumsuk ceramic balls layer is 2.5~3.5 mm in diameter.

9. The water purifier of claim 1, wherein the antibiotic ceramic balls layer is 4~6 mm in diameter.

10. The water purifier of claim 1, wherein the ceramic material tube comprises 5% of the first magnet tube, 10% of the bio ceramic balls, 20% of the tourmalin ceramic balls, 10% of the alumina ceramic balls, 15% of the natural black jades, 10% of the sericite ceramic balls, 15% of the bio macsumsuk ceramic balls, 10% of the antibiotic ceramic balls, 5% of and the second magnet tube in volume.

11. The water purifier of claim 1, wherein a non-woven fabrics filter is positioned between neighboring layers of the ceramic material tube.

\* \* \* \* \*